(12) United States Patent
Jackson et al.

(10) Patent No.: US 7,455,541 B2
(45) Date of Patent: Nov. 25, 2008

(54) APPARATUS AND METHOD FOR SEALING AN ELECTRICAL CONNECTOR

(75) Inventors: Roy Jackson, Houston, TX (US); Jeffrey W. Harvill, Sr., Keithville, LA (US); Michael G. Colescott, Galveston, TX (US)

(73) Assignee: Power Feed-Thru Systems & Connectors, LLC, Deer Park, TX (US)

( * ) Notice: Subject to any disclaimer, the term of this patent is extended or adjusted under 35 U.S.C. 154(b) by 0 days.

(21) Appl. No.: 11/948,011

(22) Filed: Nov. 30, 2007

(65) Prior Publication Data
US 2008/0132115 A1    Jun. 5, 2008

Related U.S. Application Data

(63) Continuation-in-part of application No. 11/536,116, filed on Sep. 28, 2006, which is a continuation-in-part of application No. 11/458,939, filed on Jul. 20, 2006.

(60) Provisional application No. 60/812,887, filed on Jun. 12, 2006.

(51) Int. Cl.
*H01R 13/52*    (2006.01)

(52) U.S. Cl. ..................... 439/274; 439/589
(58) Field of Classification Search ................ 439/274, 439/275, 587–589
See application file for complete search history.

(56) References Cited

U.S. PATENT DOCUMENTS

| | | | |
|---|---|---|---|
| 2,553,619 A * | 5/1951 | Woodling | ............ 285/341 |
| 3,945,700 A | 3/1976 | Didier | |
| 4,728,296 A | 3/1988 | Slamm | |
| 4,927,386 A | 5/1990 | Neuroth | |
| 5,458,507 A | 10/1995 | Colescott | |
| 2007/0049093 A1 * | 3/2007 | Otten et al. | ........... 439/321 |

* cited by examiner

*Primary Examiner*—Khiem Nguyen

(57) ABSTRACT

A connector comprises a substantially cylindrical housing having an internal circumferential groove therein. A seal element is disposed within the housing, the seal element having an axial passage therethrough. A plurality of circumferential sealing lips are spaced apart along the axial passage and sized such that each of the plurality of circumferential sealing lips provides a compression seal along a cable element inserted through the axial passage. A follower abuts the seal element. A spring is disposed in the groove acting against the follower and forcing the follower against the seal to maintain a fluid seal on the cable element.

20 Claims, 9 Drawing Sheets

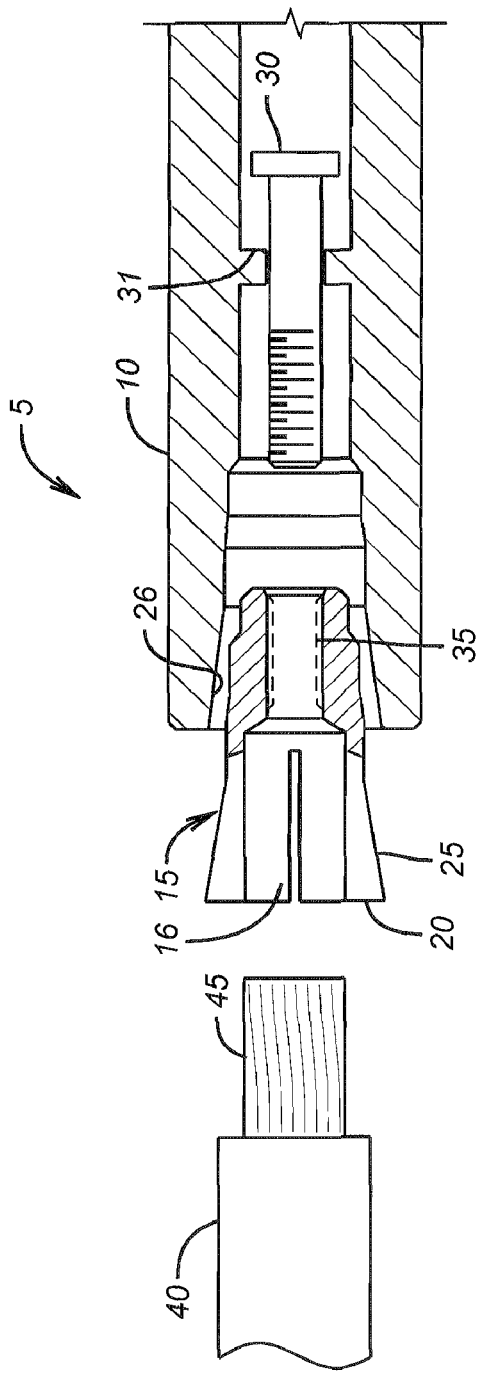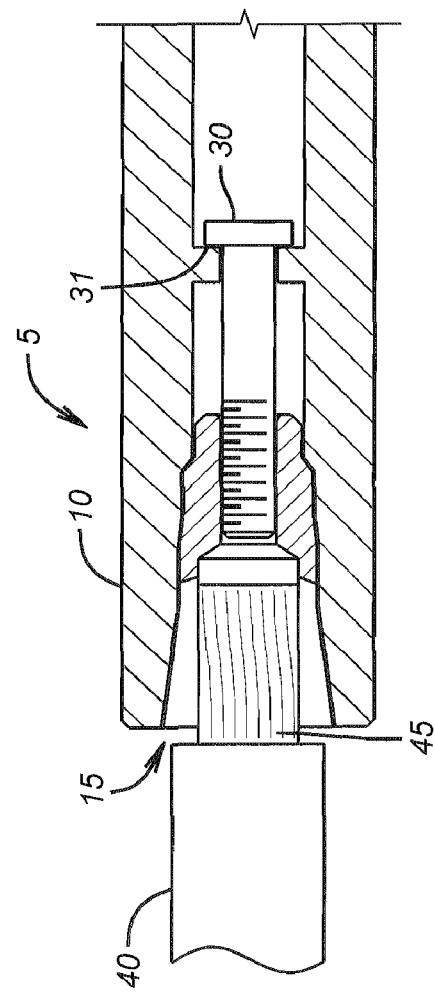
FIG. 1
FIG. 2

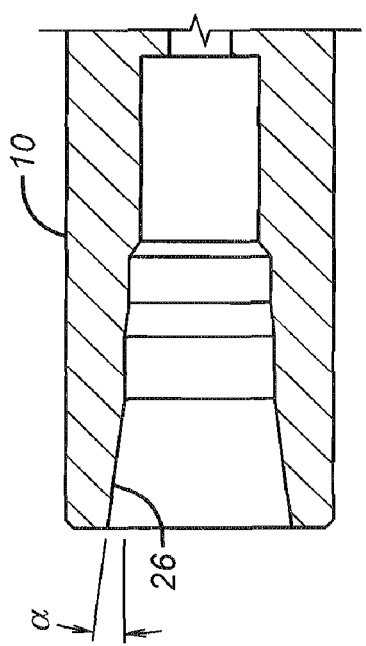
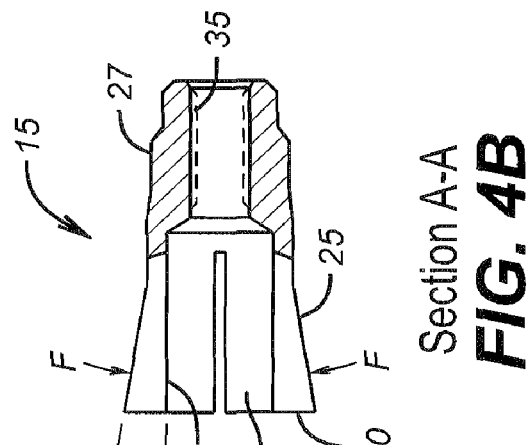
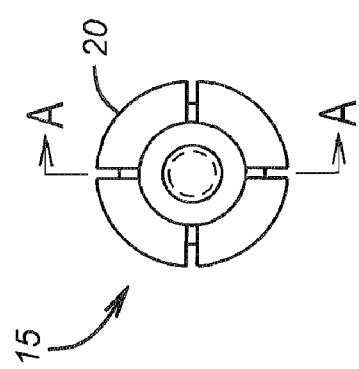
FIG. 3
FIG. 4A
FIG. 4B
Section A-A

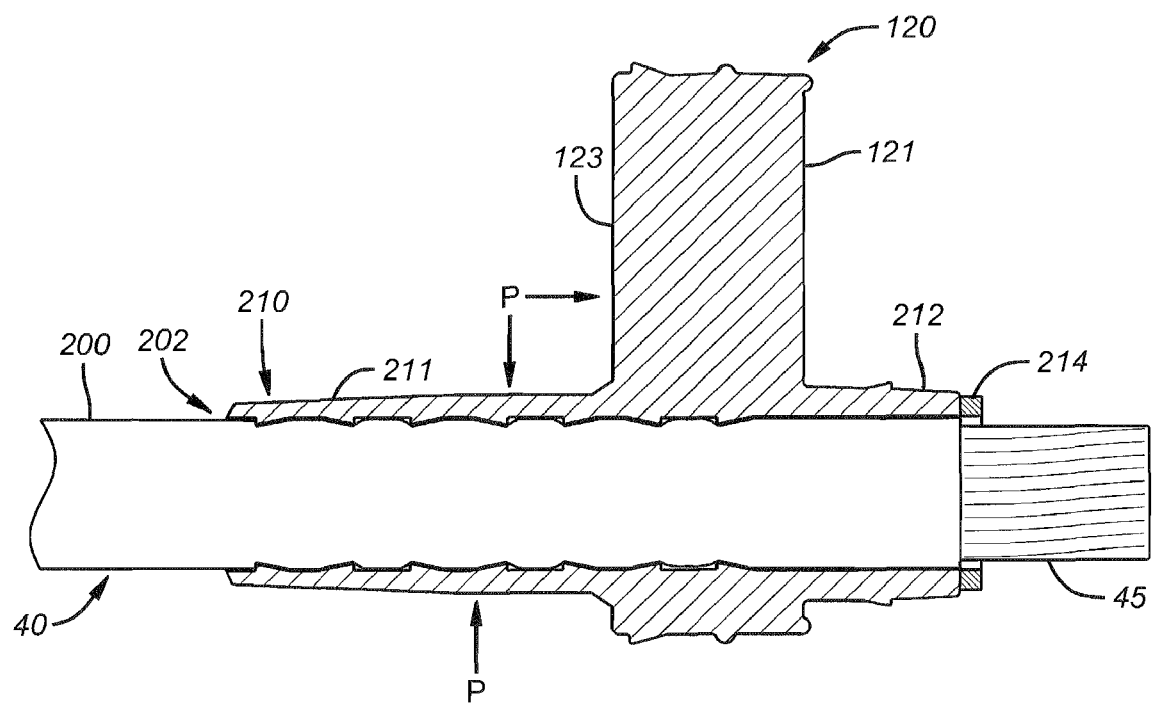
FIG. 7
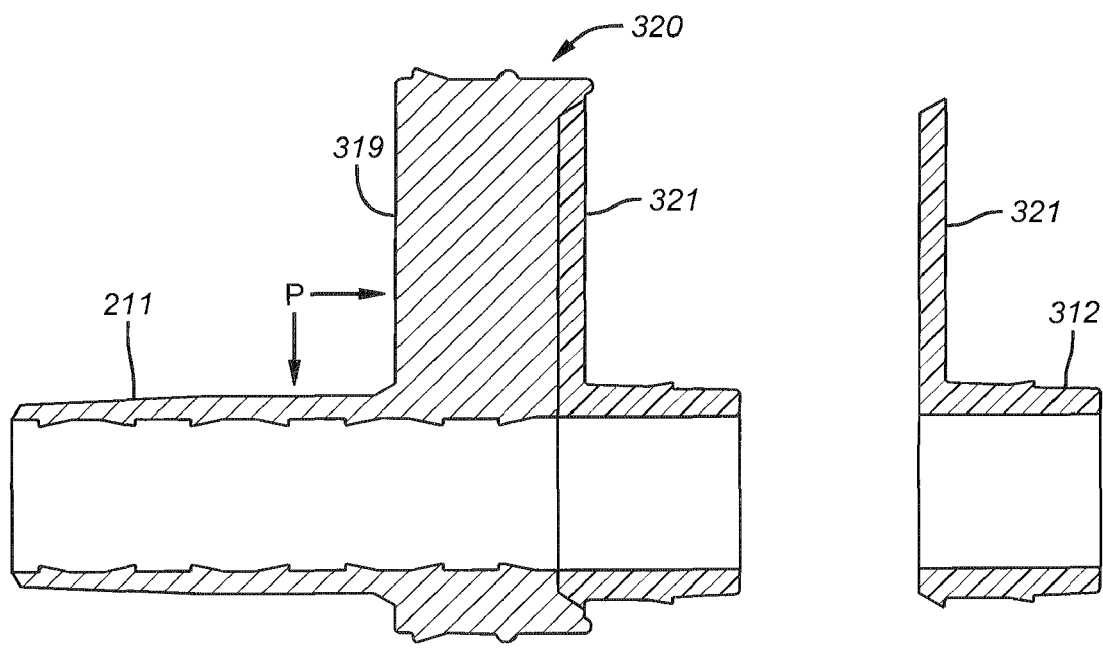
FIG. 9A  FIG. 9B

APPARATUS AND METHOD FOR SEALING AN ELECTRICAL CONNECTOR

CROSS-REFERENCE TO RELATED APPLICATIONS

This application is a Continuation-in-Part of U.S. application Ser. No. 11/536,116 filed Sep. 28, 2006, which is a Continuation-in-Part of U.S. application Ser. No. 11/458,939 filed Jul. 20, 2006, which claims priority from U.S. Provisional Application 60/812,887 filed on Jun. 12, 2006, each of which is incorporated herein by reference.

BACKGROUND

1. Field of the Invention

The present invention relates to the field of electrical connectors and more particularly to sealing of conductors therein.

2. Background Information

Numerous applications involve the use of electrical connectors. High power connectors are used in applications including subsea connections, and in submersible pump connections in both water wells and oil wells. The size, weight, and orientation of the cables and connectors induce mechanical loads on connector components that make reliable mechanical and electrical connection difficult. In addition, the physical environment may include high temperature, high pressure, and abrasive and/or corrosive fluids, including liquids and gases.

The sealing of the electrical conductors in the connector from the surrounding fluids is crucial in such high power applications.

SUMMARY

In one aspect of the present invention, a connector comprises a substantially cylindrical housing having an internal circumferential groove therein. A seal element is disposed within the housing, the seal element having an axial passage therethrough. A plurality of circumferential sealing lips are spaced apart along the axial passage and sized such that each of the plurality of circumferential sealing lips provides a compression seal along a cable element inserted through the axial passage. A follower abuts the seal element. A spring is disposed in the groove acting against the follower and forcing the follower against the seal to maintain a fluid seal on the cable element.

In another aspect, a method for sealing a cable comprises forming a plurality of sealing lips spaced apart along an axial passage of an elastomeric seal element. Each of the plurality of sealing lips is sized such that each of the plurality of sealing lips provides a compression seal along a cable element inserted through the axial passage. A follower applies force against the elastomeric seal element to maintain the compression seal along the cable element.

Non-limiting examples of certain aspects of the invention have been summarized here rather broadly, in order that the detailed description thereof that follows may be better understood, and in order that the contributions they represent to the art may be appreciated. There are, of course, additional features of the invention that will be described hereinafter.

BRIEF DESCRIPTION OF THE FIGURES

For a detailed understanding of the present invention, references should be made to the following detailed description of the exemplary embodiment, taken in conjunction with the accompanying drawings, in which like elements have been given like numerals, wherein:

FIG. 1 shows an exploded view of a connector contact assembly according to one illustrative embodiment of the present invention;

FIG. 2 shows an assembled view of the elements of FIG. 1;

FIG. 3 shows a portion of a contact receptacle according to one illustrative embodiment of the present invention;

FIG. 4A shows an end view of a gripping contact according to one illustrative embodiment of the present invention;

FIG. 4B shows a cross-section view along section line A-A of FIG. 4A;

FIG. 7 is a sketch showing a seal element having a cable inserted through a passageway in the seal element;

FIG. 9*a* is a sketch of a seal element having an insert;

FIG. 9B is a sketch of the insert of FIG. 9A;

DETAILED DESCRIPTION

Figure 5:
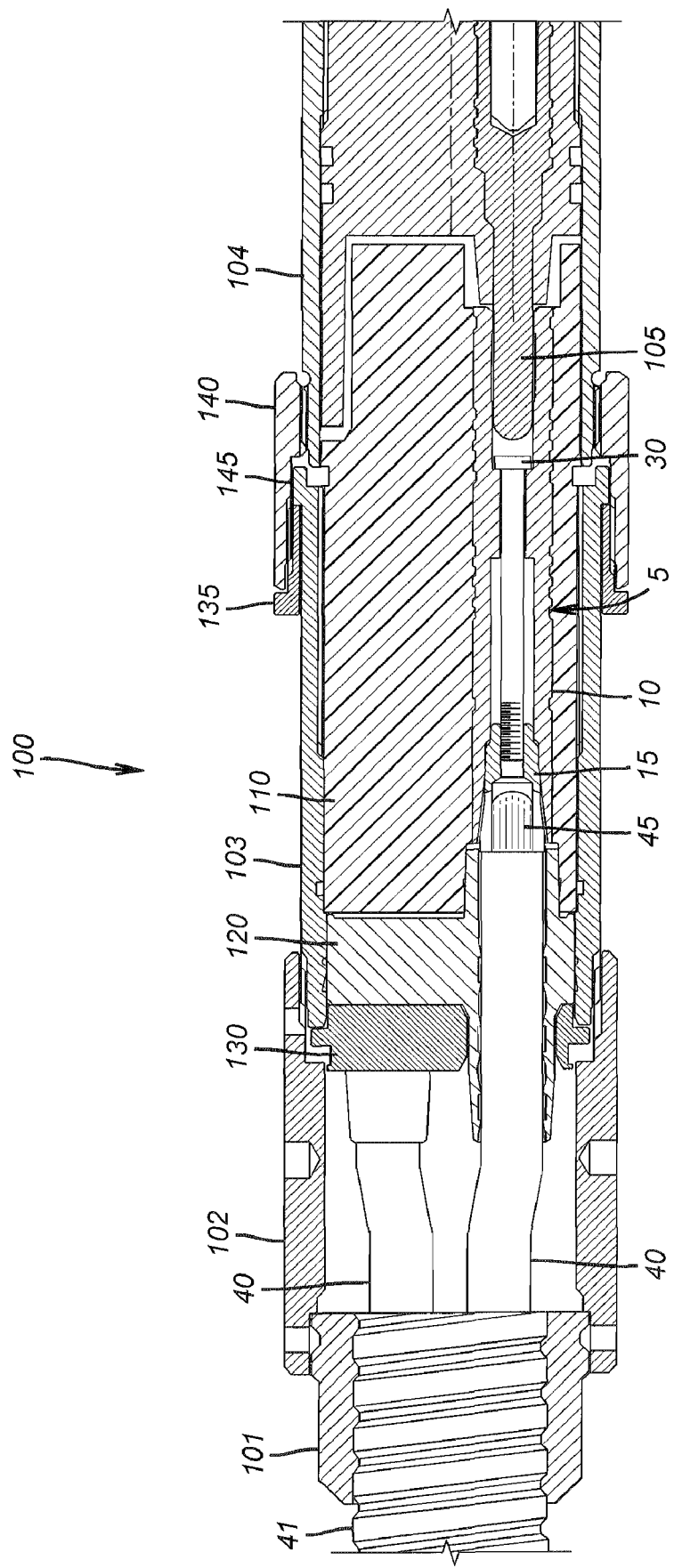
FIG. 5 shows a non-limiting example of a portion of a connector assembly according to one illustrative embodiment of the present invention.

The following description presents non-limiting examples of embodiments of the present invention. Refer now to FIGS. 1-4B. FIG. 1 shows an exploded view of a connector contact assembly 5 according to one illustrative embodiment of the present invention. As shown in FIG. 1, a cable 40 has an electrical conductor 45 therein. Electrical conductor 45 may be a solid conductor, or, alternatively, a stranded conductor.

A gripping contact 15 has a cavity 16 sized to accept electrical conductor 45. In one embodiment, the inner diameter of cavity 16 is a substantially a zero clearance fit with the outer diameter of electrical conductor 45. Gripping contact 15 (see also FIGS. 4A and 4B) comprises a plurality of gripping fingers 20 with an outer surface 25 having a substantially conical shape. As seen, in FIG. 4B, the conical surface 25 is defined by angle β. In one embodiment, angle β is about 6°. Alternatively, angle β may be in the range of about 2° to about 10°. The internal surface 21 of fingers 20 substantially defines cavity 16. While shown in FIG. 4A as comprising four fingers, any number of fingers may be used and are intended to be encompassed by the present disclosure. In one embodiment, the internal surface 21 of fingers 20 may be substantially smooth. Alternatively, in another embodiment, the internal surface 21 of fingers 20 may have a raised pattern (not shown) formed on surface 21. Such a pattern may include, but is not limited to: a thread form, a tooth form, a knurling form, and any other raised pattern form used for gripping electrical conductor 45.

On an opposite end of gripping contact 15, an integral body 27 has an internally threaded bore 35. Gripping contact 15 may be made out of an electrically conductive metal. Examples of such an electrically conductive metal include, but are not limited to: gold, silver, copper, copper alloys, aluminum, aluminum alloys, brass, bronze, and any other suitable electrically conducting metal. The surfaces 25 and 21 of fingers 20 may be plated with a suitable electrically conductive material to reduce galling and/or wear of the gripping fingers 20. Any suitable plating may be used including, but not limited to: chrome plating, nickel plating, gold plating, and silver plating.

A contact receptacle 10 (see FIGS. 1-3), has an internal conical surface 26 having an angle $\alpha$ where $\alpha \leq \beta$. In one embodiment, $\alpha$ is about 1.0° smaller than $\beta$. Alternatively, $\alpha$ may be smaller than $\beta$ from about 0.5° to about 1.5°. The difference in angles ensures that fingers 20 of gripping contact 15 are forced to collapse around and compress electrical conductor 45, as shown in FIGS. 1 and 2, when gripping contact 15 is urged axially into contact receptacle 10. Contact receptacle 10 may be made from any of the materials as described previously for gripping contact 15. Similarly, contact receptacle 10 may be plated by any of the platings discussed previously with respect to gripping contact 15.

As shown in FIGS. 1 and 2, threaded element 30 engages threads 35 in gripping contact 15 and, under tension, reacts against shoulder 31 in contact receptacle 10 such that gripping contact 15 is axially urged into contact receptacle 10. This motion causes interaction between outer surface 25 and inner surface 26 such that fingers 20 of gripping contact 15 are forced to collapse around and compress electrical conductor 45 along substantially the length of the extension of electrical conductor 45 into gripping contact 15. The use of threaded element 30 provides a substantially repeatable force urging gripping contact 15 into contact receptacle 10, thereby providing a repeatable holding force between electrical contact 45 and connector contact assembly. In addition, the substantially repeatable axial holding force provides a repeatable electrical contact between fingers 20 of gripping contact 15 and both electrical conductor 45 and contact receptacle 10. Threaded element 30 may be a suitably sized threaded fastener that may be commercially available. Alternatively, threaded element 30 may be designed for this particular application using techniques known in the art.

FIG. 5 depicts a non-limiting example of a portion of a connector assembly 100 according to one illustrative embodiment of the present invention. Connector assembly 100 may be a power connector for use in connecting a power source to a submersible pump in a well. Alternatively, connector assembly 100 may be a sub-sea connector. As shown in FIG. 5, a multi-conductor armored cable assembly 41 has at least one insulated cable 40 with an internal electrical conductor 45. Armored cable assembly 41 is connected to connector assembly 100 by cable adapter 101. Crossover 102 connects cable adapter 101 to lower housing 103.

It will be appreciated by one skilled in the art that the portion of connector assembly 100 shown in FIG. 5 may be immersed in a high pressure fluid such as, for example, in a wellbore. To seal high pressure fluid from the internal electrical connections, cable 40 is inserted through seal 120. Seal 120 is an elastomer seal that is compressed around the insulation of cable 40 to preclude passage of fluid toward the electrical contacts 15 and 10. Seal 120 is held in place by follower 130. Seal 120 may be made of a suitable elastomer. Suitable elastomers include but are not limited to, natural rubber, synthetic rubber, fluoroelastomers, perfluoroelastomers, ethylene propylene diene rubber (EPDM), and any other suitable elastomer.

Connector contact assembly 5 is inserted into an insulator 110 that is located above seal 120. As shown, connector contact assembly 5 comprises gripping contact 15 assembled in contact receptacle 10 and held in place by threaded element 30. To better facilitate field assembly, insulator 110 is located in lower housing 103 and upper housing 104 that are connected through coupling nut 140 and shoulder nut 135 acting against shoulder 145. Insulator 110 may be a thermoplastic suitable for the particular environment encountered. Examples of such a thermoplastic include, but are not limited to, a polyetheretherketone material and a glass-filled polyetheretherketone material. Gripping contact 15 is in engaged contact, both mechanically and electrically with electrical conductor 45. Connector assembly 5 conducts an electrical power signal to contact 105 which is electrically conducted to a surface power control system. One skilled in the art will appreciate that the connector assembly 5 and its components may be appropriately scaled to fit different size electrical conductors without undue experimentation.

Figure 6:
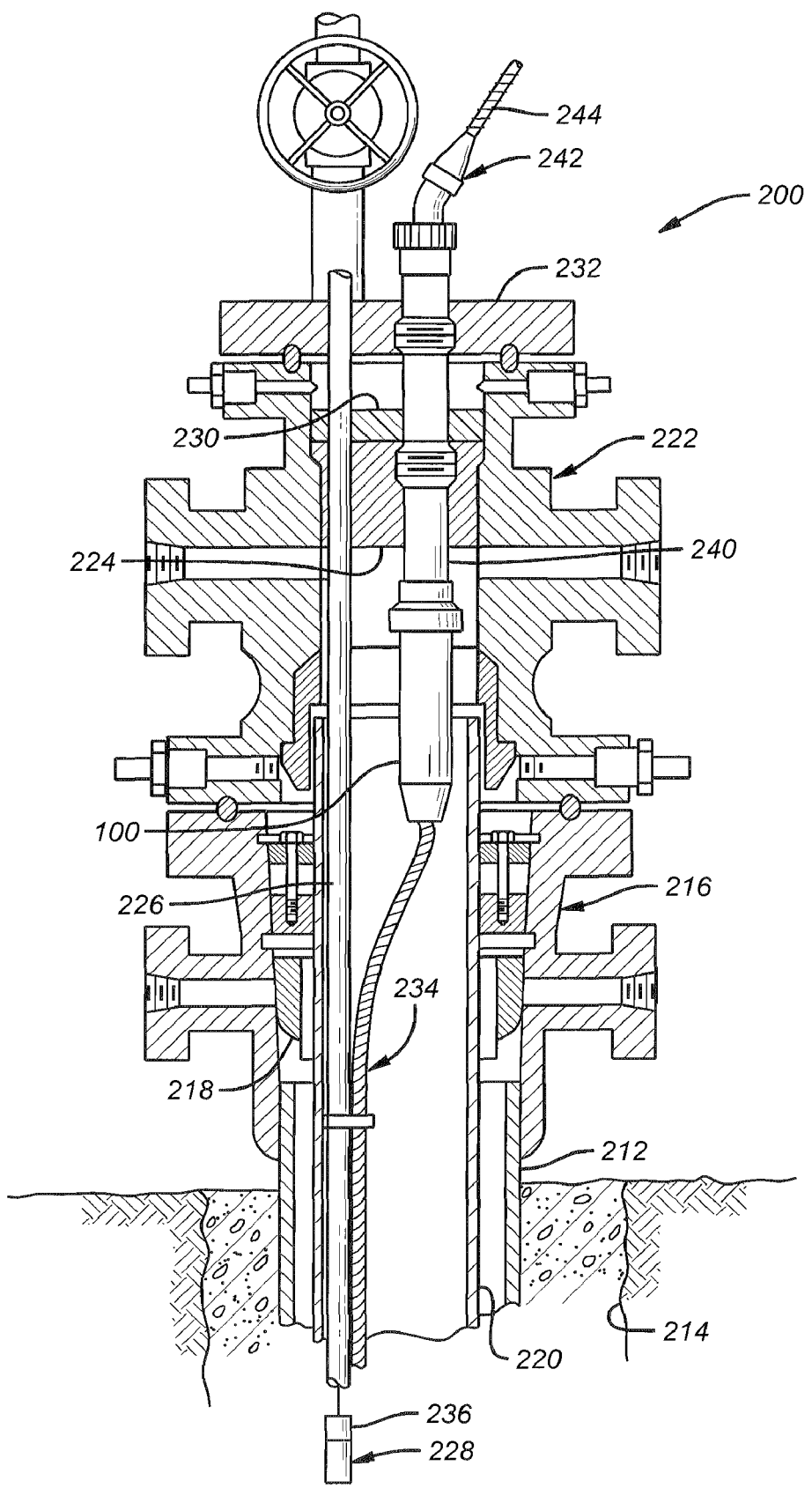
FIG. 6 shows a non-limiting example of a connector utilizing a contact assembly of one embodiment of the present invention to connect power to a submersible pump.

One non-limiting example of an application of the present invention is shown in FIG. 6. In FIG. 6, a well 200 comprises a string of surface pipe 212 cemented in the upper portion of a bore hole 214 which extends into the earth to a location adjacent and usually below a subterranean oil productive formation (not shown). A wellhead 216 attaches to the surface pipe 212. A set of slips 218 suspends a casing string 220 inside the bore hole 214 which is also cemented in place. A casing head 222 connects to the upper end of the casing string 220 and includes a tubing hanger 224.

A tubing string 226 is suspended from the tubing hanger 224 and extends downwardly inside the casing string 220 to a location adjacent the productive formation. An electrically powered submersible pump 228, of any suitable type, on the lower end of the tubing string 226 pumps oil or an oil-water mixture from the inside of the casing string 220 upwardly through the tubing string 226.

Electric power is delivered to the downhole pump 228 through an armored cable 234 connected to a motor 236 comprising part of the submersible pump 228. The cable 234 extends upwardly in the well 210 to a connector 100 of the present invention located immediately below the tubing hanger 224. The connector 100 is secured to a mandrel or feed through socket 240 extending through the hanger 224, seal assembly 230 and flange 232. The connector 100 employs a contact assembly as described previously. In one embodiment, a pig tail connector 242 attaches the mandrel 240 to a power cable 244 extending to a source of power at the surface. While described above as used in a submersible pump application, it is intended that the present invention encompass all applications requiring high electrical power transmission. Such applications include, but are not limited to: electrical motor connectors, transformer connectors, electrical generator connectors, welding machine connectors, and any other such electrical and/or electromagnetic devices.

Figure 8B:
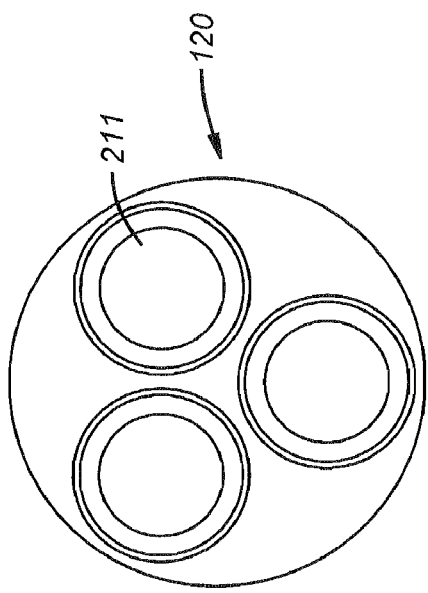
FIG. 8B is an end view of the seal element of FIG. 7.
Figure 8C:
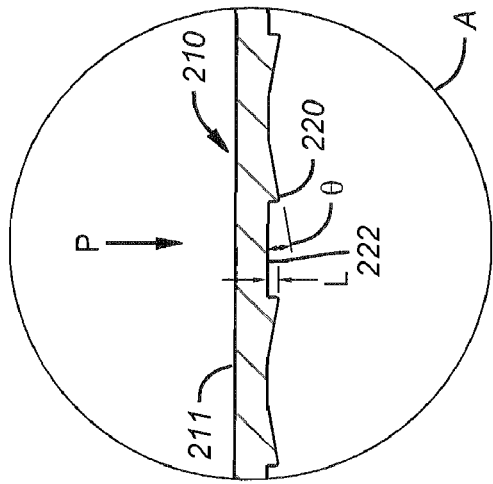
FIG. 8C is an enlarged view of bubble A of FIG. 8B.
Figure 8A:
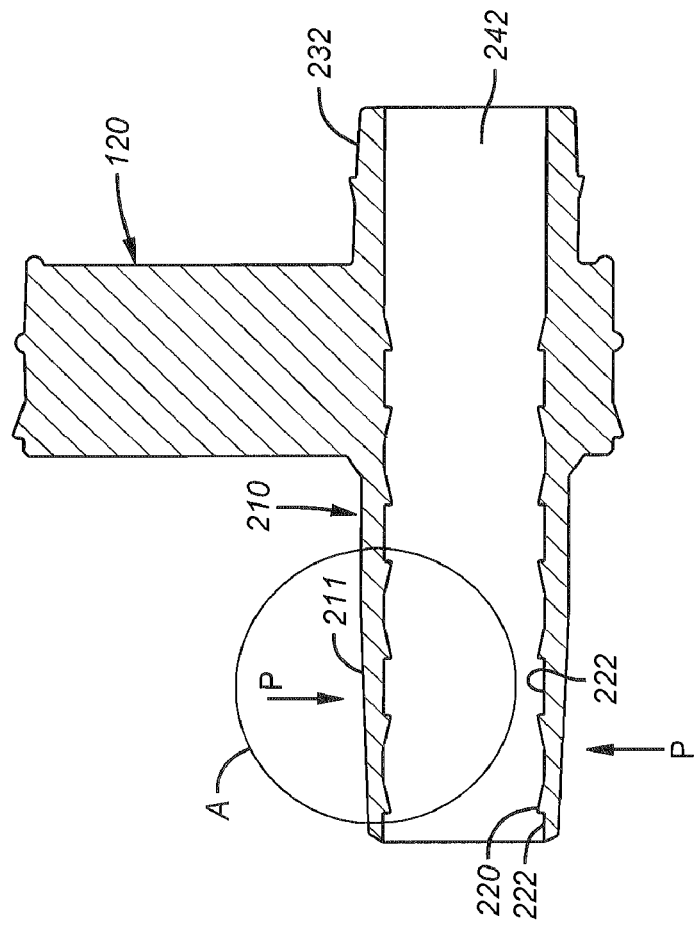
FIG. 8A is a cross section of the seal element of FIG. 7.

In one illustrative embodiment, FIGS. 7-8C show elastomer seal element 120, with cable 40 extending through an axial passage 211 in seal element 120. Cable 40 has an insulating sheath 200 covering conductor 45. Seal element 120 has a substantially cylindrical seal body 121 that fits closely in housing 103. Seal element 120 also has an integral boot 211 extending outward from seal body 121. Boot 211 is sized to receive cable 40. As shown in FIG. 8B, seal 120 may have multiple passages 211 for receiving multiple cables 40. As discussed previously, seal 120 may be made of any suitable elastomer. Suitable elastomers include but are not limited to, natural rubber, synthetic rubber, fluoroelastomers, perfluoroelastomers, ethylene propylene diene rubber (EPDM), and any other suitable elastomer. It is intended that the present invention encompass any number of conductors that may be accommodated within a given housing geometry.

Boot 211 is exposed to the ambient fluid in the proximity of the installed connector 100 (see the preceding discussion relating to FIGS. 5 and 6). Spaced apart along the internal surface of passage 211 is a plurality of sealing lips 220. As seen in FIGS. 7-8C, each sealing lip 220 has a recessed surface 222 adjacent thereto. Sealing lip 220 extends, in an undeformed state, a distance L above recessed surface 222, where L is in the range of about 0.010 to about 0.030 inches. In one embodiment, sealing lip 220 has a substantially conical form in an undeformed state such that sealing lip 220 forms an angle θ with recessed surface 222, where angle θ is in the range of about 5 to about 15 degrees.

In one non-limiting example, the sealing lips 220 have an initial compression against insulator 200 in the range of about 5-15%, thereby providing an initial fluid seal at the interface between sealing lip 220 and insulator 200. As increasing external fluid pressure acts on the outer surface of boot 211, the elastomer material of boot 211 is further compressed against insulator 200 of cable 40. As the fluid pressure increases, boot 211 is increasingly compressed against insulator 200. The increased compression causes sealing lip 220 to flatten out against insulator 200, thereby increasing the sealing area as the fluid pressure is increased. The flattening of lip 220 also causes the edge of lip 220 to encroach into the cavity bounded by the insulator 200, recessed surface 222, and lip 220. The same process occurs at each lip 220 along boot 210. The plurality of seal lips 220 generates multiple redundant seals along boot 210 to prevent the incursion of contaminated fluid 202 along the interface between boot 210 and insulator 200.

FIG. 7 also shows a conductor boot 212 extending axially toward the opposite direction from boot 210. As shown in FIG. 5, conductor boot 212 fits into insulator 110 where conductor 45 is coupled to gripping contact 15. As shown in FIG. 4A, gripping contact 15 has several slotted fingers facing conductor boot 212. When high fluid pressure P (see FIG. 7), acts against surface 123 of seal 120, seal 120 is forced axially in housing 103 (see FIG. 5) such the end of conductor boot 212 may be extruded into the slots in gripping contact 15. In one embodiment, an anti-extrusion washer 214 is attached to the end of conductor boot 212. Anti-extrusion washer 214 is made of an insulating material such as, for example, an elastomer or a thermoplastic. Any suitable elastomer or thermoplastic having a suitable hardness to prevent extrusion under high pressure may be used. For example, elastomers having a Shore A durometer greater than 70 may be used. In one embodiment, washer 214 may be adhesively attached to the end of conductor boot 212. Alternatively, washer 214 may be molded into the end of conductor boot 212 during manufacture of conductor boot 212.

In another embodiment, see FIG. 9, seal 320 is similar in dimensions to previously described seal 120 and may be used interchangeably with seal 120 in connector 100. Seal 320 has integral boot 211 molded on one side and an insert 321 molded into an opposite side. Insert 321 has at least one conductor boot 312 molded therein. Insert 321 may be of an elastomer material that is different than the elastomer material of seal 320. In one example, the elastomer material of insert 321 may be an EPDM material having a Shore A hardness in the range of 70-80. The material of insert 321 is substantially harder than the material of the body 319 of seal 320. The additional hardness acts to reduce extrusion of conductor boot 312 into the facing slots in gripping contact 15 as described previously.

Figure 10:
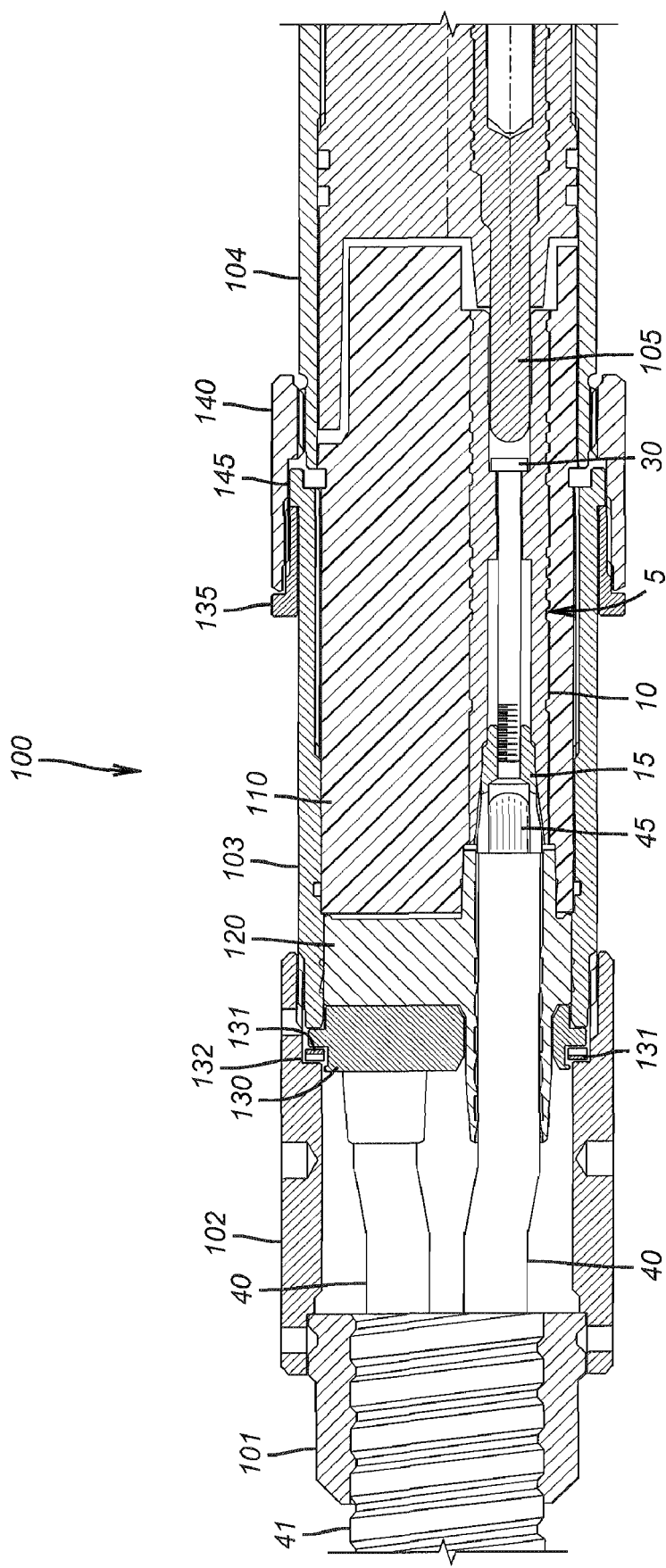
FIG. 10 is a sketch of a connector comprising a wave spring forcing a follower against the seal element.

As described above, the various embodiments of the present invention may be immersed in a fluid environment that experiences extreme pressures and temperatures. For example, temperatures may exceed 500° F. and pressures may exceed 20,000 PSI. In addition, the pressure and temperature may vary over time. These extreme conditions and their possible time variations require active techniques for maintaining a fluid seal as the conditions vary. In one example, considering an elastomeric seal and a metallic housing, as the temperature of the surrounding environment increases, the diameter of seal element 120 expands more than the diameter of housing 103 due to the difference in thermal expansion coefficients of seal 120 and housing 103. The radial restraint of the expansion causes substantial stresses to build up in seal 120. As the stresses increase, seal 120 will expand axially, due to Poisson's effect, to relieve the radial stress. The axial length of groove 132 is chosen to provide sufficient length to accommodate the seal's axial expansion. Conversely, when the surrounding temperature is reduced, seal 120 contracts more than housing 103 and may no longer provide sufficient radial squeeze on cable 40 and/or housing 103 to affect a fluid seal. Pressure effects may have similar effects. For example, at high pressures, the fluid pressure acts against the fluid exposed face of seal 120, compressing the seal axially. This loading results in radial expansion of the seal due to Poisson's effect. Rapid lowering of the pressure may relax the radial squeeze on both housing 103 and/or cable 40 such that there is no longer sufficient sealing interaction at one or both locations. In order to allow for the changing conditions, in another embodiment of the present invention, see FIG. 10, spring 131 is disposed in groove 132 and applies a force through follower 130 to seal 120. The axial length of groove 132 is sufficient to accommodate the axial expansion. The spring force applied to seal 120 is sufficient to radially expand seal 120 to maintain a seal on cable 40 and housing 103 in the presence of thermal and/or pressure cycling of the surrounding environment. In the embodiment shown in FIG. 10, spring 131 is a wave spring, for example a wave spring commercially available from the Smalley Steel Ring Company of Lake Zurich, IL. Multiple springs may be stacked together to provide suitable loading and expansion travel. In one example, a wave spring exerts a force of up to 40 lbf on follower 130, and provides a travel distance of 0.030 in.

Figure 11:
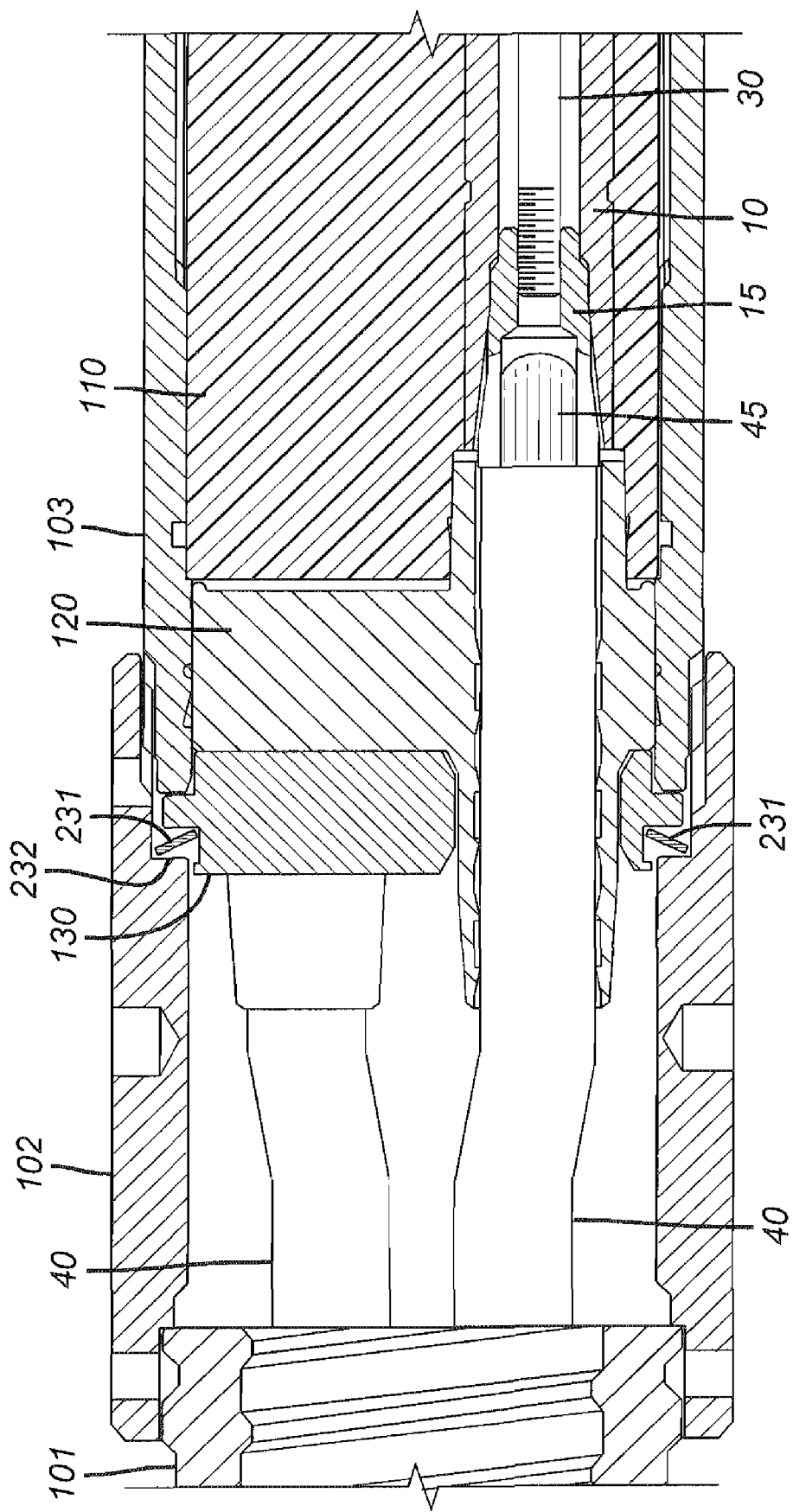
FIG. 11 is a sketch of a connector comprising a disc spring forcing a follower against the seal element.

In another example, see FIG. 11, one or more disc springs 231, also called Belleville springs, may be disposed in groove 232 to apply force to follower 130.

Figure 12:
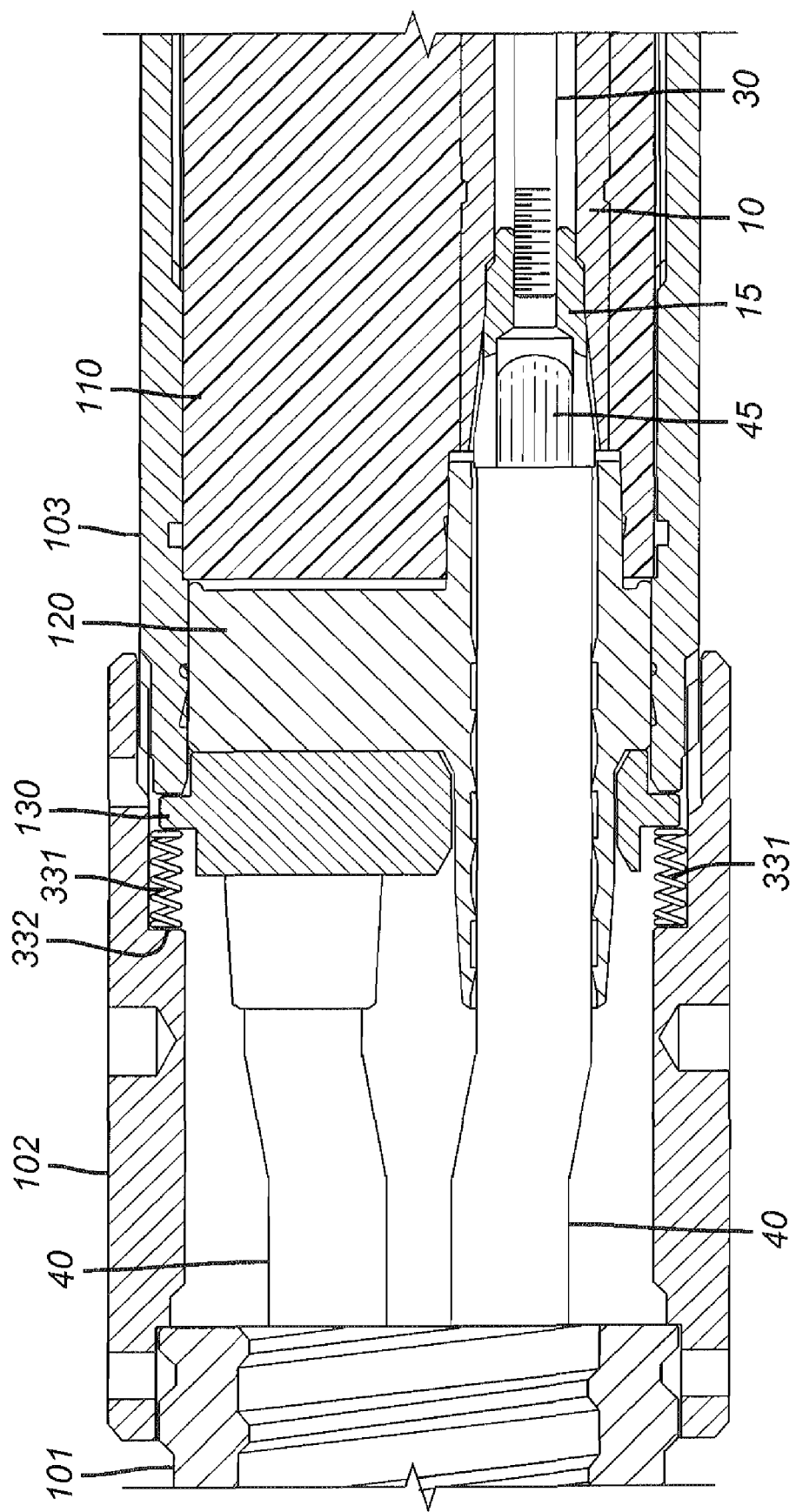
FIG. 12 is a sketch of a connector comprising a coil spring forcing a follower against the seal element.

In yet another example, see FIG. 12, a plurality of individual coil springs 331 may be disposed around the periphery of groove 332 to apply force to follower 130.

While the foregoing disclosure is directed to the non-limiting illustrative embodiments of the invention presented, various modifications will be apparent to those skilled in the art. It is intended that all variations within the scope of the appended claims be embraced by the foregoing disclosure.

What is claimed is:

1. A connector comprising:

a substantially cylindrical housing having an internal circumferential groove therein;

a seal element disposed within the housing, the seal element having an axial passage therethrough;

a plurality of circumferential sealing lips spaced apart along the axial passage and sized such that each of the plurality of circumferential sealing lips provides a compression seal along a cable element inserted through the axial passage;

a follower abutting the seal element; and a spring disposed in the groove acting on the follower, the spring forcing the follower against the seal element to maintain a fluid seal on the cable element.

2. The connector of claim 1 wherein the seal element is made of an elastomer chosen from the group consisting of: a natural rubber, a synthetic rubber, a fluoroelastomer, a perfluoroelastomer, and an ethylene propylene diene rubber.

3. The connector of claim 1 wherein the seal element further comprises a pair of opposed sealing lips having a recessed surface therebetween.

4. The connector of claim 1 wherein an initial compression of the plurality of circumferential sealing elements against the cable element is in the range of 5-15%.

5. The connector of claim 1 wherein at least one sealing lip is located in a boot integral to the seal element.

6. The connector of claim 3 wherein a fluid pressure acting on an outer diameter surface of the boot further compresses each of the plurality of sealing lips around the cable element.

7. The connector of claim 1 wherein each of the plurality of sealing lips comprises a substantially conical surface.

8. The connector of claim 7 wherein the substantially conical surface has an initial angle in the range of 5-15 degrees.

9. The connector of claim 1 further comprising an insert molded into the seal element, the insert having a conductor boot molded therein.

10. The connector of claim 9 wherein the seal element is made of a first elastomer material and the insert is made of a second elastomer material that is harder than the first elastomer material.

11. The connector of claim 1 wherein the spring comprises a coil spring.

12. The connector of claim 1 wherein the spring comprises a slanted coil spring.

13. The connector of claim 1 wherein the spring comprises a wave spring.

14. The connector of claim 1 wherein the spring comprises a belleville spring.

15. The connector of claim 1 wherein the follower is axially constrained in the groove.

16. A method of sealing a connector comprising:
   forming an internal circumferential groove in a substantially cylindrical housing;
   disposing a seal element within the housing, the seal element having an axial passage therethrough;
   spacing apart a plurality of circumferential sealing lips along the axial passage;
   sizing each of the plurality of circumferential sealing lips such that each of the plurality of circumferential sealing lips provides a compression seal along a cable element inserted through the axial passage;
   abutting a follower against the seal element; and
   forcing the follower against the seal element to maintain a fluid seal on the cable element using a spring disposed in the groove and acting on the follower.

17. The method of claim 16, further comprising locating at least a portion of the plurality of sealing lips along an axial passage of a boot connected to the elastomer seal element such that fluid pressure on an external surface of the boot increases the compression of the sealing lips on the cable element.

18. The method of claim 16 wherein the spring comprises a wave spring.

19. The method of claim 16 wherein the spring comprises a coil spring.

20. The method of claim 16 wherein the follower is axially constrained in the groove.

\* \* \* \* \*